Patented Apr. 7, 1953

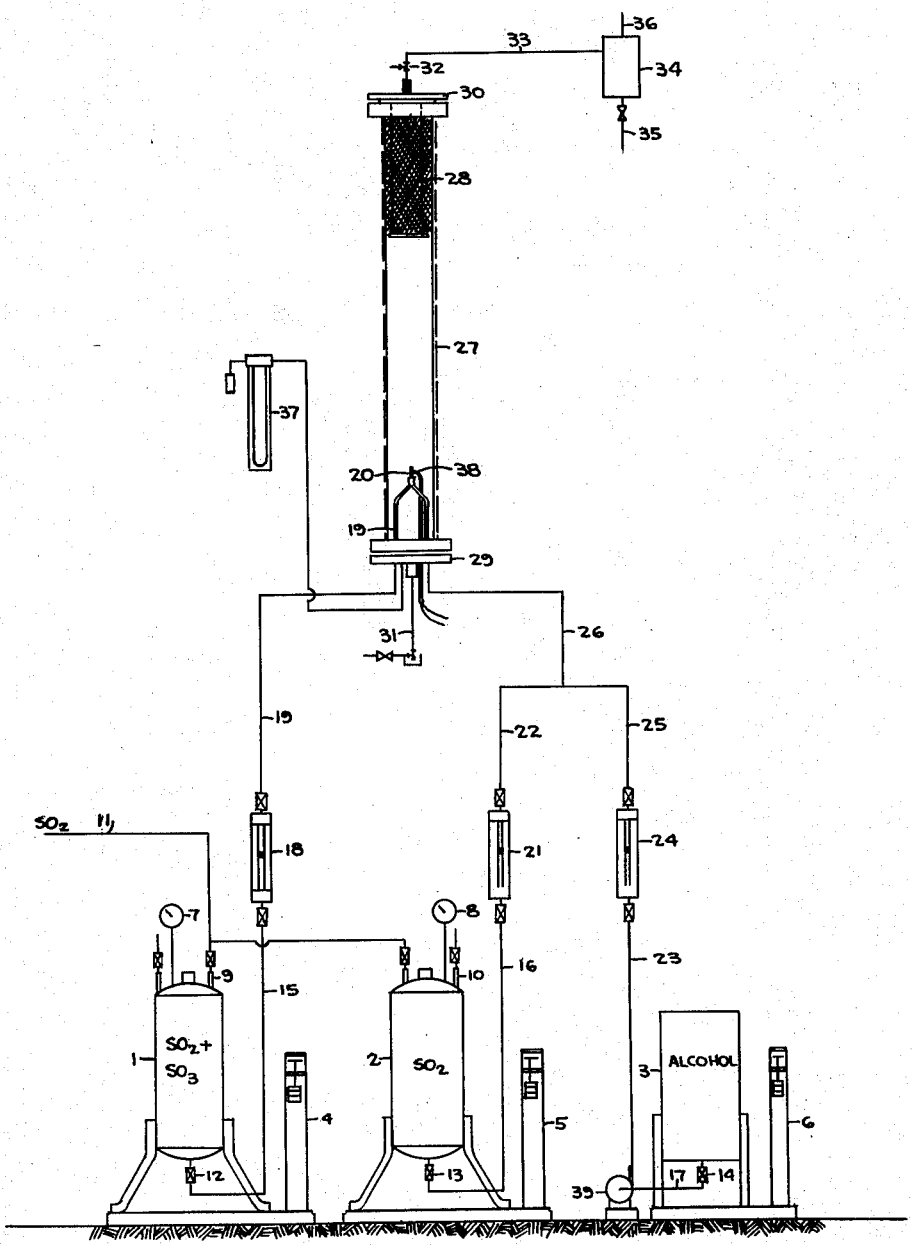

2,634,287

UNITED STATES PATENT OFFICE 2,634,287

PROCESS FOR SULFATION OF ALIPHATIC ALCOHOLS

John K. Fincke, Dayton, Ohio, assignor to Monsanto Chemical Company, St. Louis, Mo., a corporation of Delaware Application April 1, 1948, Serial No. 18,447

6 Claims. (Cl. 260—459)

This invention relates to a process for sulfating aliphatic alcohols.

An object of the present invention is to provide a process for sulfating aliphatic compounds containing at least one hydroxy group such as alcohols, glycols or glycerides. A further object is to provide a process for carrying out the sulfation reaction substantially instantaneously. The present invention constitutes an improvement upon the process of sulfating organic compounds involving the use of sulfur dioxide as a solvent and $SO_3$ as the sulfating agent.

In prior processes it has been proposed to carry out the sulfation of alcohols in liquid sulfur dioxide by indirectly precooling streams of the sulfating agent and the alcohol to be sulfated, combining the streams in a zone at subatmospheric temperatures, then flowing the stream into a second zone at a temperature higher than the first zone and then diluting the product with water in order to stop the reaction.

According to my invention, sulfation is accomplished substantially instantaneously by mixing together a stream of liquid $SO_2$ containing an aliphatic alcohol and a stream of liquid $SO_2$ containing dissolved $SO_3$. In the preferred form of my invention streams are mixed together in a mixing zone comprising preferably a short, tubular nozzle, then sprayed out into a chamber maintained at substantially atmospheric pressure. I have found that when operating in this manner the pressure drop across the spray nozzle is at least 40 pounds per square inch and less than 100 pounds per square inch. This corresponds to from 200 to 500 times the pressure drop obtained when the corresponding mass of liquid flows through the same nozzle. As a result of the reaction heat generated by the sulfation reaction, evaporation of an equivalent amount of the liquid $SO_2$ occurs in the nozzle, the formation of the gaseous $SO_2$ in this manner accounting for the observed large pressure drop therein. The resulting mixture of sulfated product and vaporized $SO_2$ leaving the nozzle at high velocity sprays into the collection chamber which is designed to separate the sulfated alcohol products from the vaporized gaseous $SO_2$. Both products, namely, the sulfated alcohol product and the vaporized sulfur dioxide may thereafter be recovered in any suitable manner.

The pressure drop across the nozzle when the sulfation reaction takes place in the nozzle is at least 200 times and may be as high as 500 times that observed for the same mass flow of liquid. The pressure drop depends upon the rate of evaporation of $SO_2$ which in turn depends upon the heat of sulfation and rate of reaction of the alcohols treated and to a lesser extent upon the degree of dilution of the reactants. The temperature of sulfation, which may be controlled by the amount of $SO_2$ used as solvent for the reactants, should be at least 20° C. and not substantially in excess of 75° C. By using smaller proportions of solvent $SO_2$, the temperature of sulfation will be higher than when using larger quantities and vice versa. Except as explained above, the proportion of $SO_2$ present during the reaction is not critical as far as the reaction itself is concerned. However, as stated, by varying the proportions of liquid $SO_2$ used as the solvent the temperatures may be varied within the range indicated.

By reason of the fine state of subdivision of the sulfation product leaving the nozzle, any liquid or gaseous $SO_2$ in the product is rapidly and completely separated and removed therefrom.

As contrasted with previous processes, the present process of sulfation takes place under adiabatic conditions; in other words, there is no gain or loss of heat to the system. The reaction takes place at temperatures of at least 20° C., but below 70° C., and is completed as far as it is possible to ascertain in the space of time required for passage of the material through the short spray nozzle.

By means of the present invention, it is possible to sulfate any aliphatic hydroxy compound which is soluble in liquid sulfur dioxide at room or slightly elevated temperatures. The compounds which may be sulfated may be either primary or secondary alcohols, polyhydric alcohols, mono- or diglycerides, or mixtures of one or more of these compounds. Specific alcohols which may be sulfated by my process are the following:

| | |
|---|---|
| Methyl | Octyl |
| Ethyl | 2-ethylhexyl |
| Propyl | Decyl |
| Butyl | Lauryl |
| Secondary isobutyl | Tetradecyl |
| Hexyl | Octadecyl | or any mixtures thereof. Polyhydric alcohols such as ethylene glycol, polyethylene glycol or glycol or polyglycol esters of fatty acids or the corresponding ethers of aliphatic alcohols may also be employed. Also contemplated are the mono- and diglycerides of fatty acids or mixtures of such glycerides.

I have found that the $SO_3$ combines quantitatively with the —OH group of the alcohol molecule and that it is possible to introduce as many $SO_3$ groups as there are —OH groups present in the molecule. This is done merely by proportioning the $SO_3$ present in the liquid $SO_2$ stream entering the mixing nozzle so that it contains the number of molecules which it is desired to introduce into the alcohol compound. The product formed is the sulfuric acid ester: $ROSO_3H$.

The process is carried out by preparing separate solutions of sulfur trioxide in liquid $SO_2$ and of the alcohol to be sulfated dissolved in liquid $SO_2$. These solutions are stored in pressure vessels under a pressure corresponding substantially to the vapor pressure of the respective solutions. From the pressure vessels the solutions are withdrawn by means of suitable pipes which connect with a nozzle of relatively short length. The solutions when caused to flow into the nozzle become intimately mixed therein, sulfation of the alcohol takes place and heat of reaction is thereupon liberated. The liberated heat causes vaporization of $SO_2$ within the nozzle. The large volume of gas liberated within the nozzle causes a pressure drop which is at least 200 times and may be as high as 500 times that of the corresponding mass flow of liquid material. The pressure drop across the nozzle during sulfation has been found to be at least 40 pounds per square inch and usually less than 100 pounds per square inch. When liquid $SO_2$ is passed through the same nozzle the pressure drop is about 0.2 pound per square inch.

The mixture of gaseous $SO_2$ and liquid sulfation product is collected in a gas-liquid separating chamber operating at substantially atmospheric pressure. The vaporized $SO_2$ being water-free is economically recovered, compressed and liquefied without further purification for reuse in the process. The sulfated hydroxy compound is neutralized with caustic alkali to produce the alkali metal salts of the corresponding sulfuric acid esters.

Reference is made to the single figure of the drawing showing in diagrammatic form apparatus suitable for carrying out the present process. Referring to the drawing, numeral 1 indicates a tank suitable for containing a sulfur dioxide solution of sulfur trioxide. Tank 2 contains liquid sulfur dioxide. Tank 3 contains the alcohol to be sulfated. Tanks 1, 2 and 3 are supported upon scales 4, 5 and 6, so that the contents of the tank may from time to time be weighed. Tanks 1 and 2 are provided with pressure gauges 7 and 8, respectively, and also with connections 9 and 10 for introducing liquid $SO_2$ from pipe 11. Tanks 1, 2 and 3 are provided with bottom outlets and valves 12, 13 and 14, respectively, for controlling the flow of the contents thereof into pipes 15, 16 and 17, respectively. The liquid sulfur dioxide containing dissolved $SO_3$ flowing through pipe 15 passes through flowmeter 18, then through pipe 19 and enters mixing nozzle 20. Likewise the flow of liquid $SO_2$ in pipe 16 passes through flowmeter 21 into pipe 22.

The alcohol in tank 3 flows by means of pipe 17 into pump 39, whereby it is forced through pipe 23 into flowmeter 24 into pipe 25. The respective liquids flowing into pipes 22 and 25 are combined in pipe 26, wherein the alcohol dissolves in the liquid sulfur dioxide forming a solution thereof. Pipe 26 connects with nozzle 20.

Nozzle 20 is contained within chamber 27, which may be an empty tank of relatively large volume or preferably a tower provided with a packed section 28 consisting of Raschig rings or other suitable packing or filtering material. The ends of the tower are closed by means of flanges 29 and 30. An exit for liquid sulfation product is provided at 31 and a gas exit is provided at 32. Pipe 33 connects with an additional liquid gas separator 34 also provided with liquid outlet 35 and gas outlet 36. The sulfated product is withdrawn mainly by means of pipe 31 with usually a small amount being recoverable at the outlet of pipe 35. The vaporized $SO_2$ leaving gas separator 34 by means of pipe 36 may be compressed and liquefied by means not shown and returned as liquid sulfur dioxide to pipe 11 for reuse in the process.

For control purposes a manometer 37 is provided for indicating the pressure in collecting zone 27. A thermocouple 38 is also provided with its junction adjacent nozzle 20 for indicating the temperature of the nozzle and the contents therein.

The process may be illustrated by the following examples:

EXAMPLE 1

*Decyl alcohol sulfate.*—The apparatus shown in the drawing was utilized, the nozzle 20 being a 0.037" I. D. tube, 0.5" long.

Sufficient $SO_3$ is dissolved in liquid $SO_2$ in tank 1 to form a 30% by weight solution. Decyl alcohol is added to tank 3 and liquid $SO_2$ is added to tank 2. The flow of the $SO_2$-$SO_3$ solution from tank 1 is adjusted to the alcohol flow from tank 3 so that slightly more than one mole of $SO_3$ is supplied to nozzle 20 for each mole of decyl alcohol entering the nozzle. The amount of $SO_2$ from tank 2 is proportioned to the decyl alcohol flow so as to give an approximately 40% by weight solution in pipe 26. During the run, the temperature of the nozzle ranged from 25° C. to 48° C. Decyl alcohol sulfate in good yields is recovered from pipe 31.

EXAMPLE 2

*Tetradecyl alcohol sulfate.*—Sufficient $SO_3$ is dissolved in liquid $SO_2$ in tank 1 to form a 25% solution. Tetradecyl alcohol is loaded into tank 3 and liquid $SO_2$ is placed in tank 2, which may be heated if desired. The flow of tetradecyl alcohol from tank 1 and $SO_2$ from tank 2 is adjusted so that the solution in pipe 26 contains approximately 50% by weight of tetradecyl alcohol. The flow of the $SO_2$-$SO_3$ solution in tank 1 is adjusted to supply one mole of $SO_3$ to nozzle 20 for each mole of tetradecyl alcohol supplied by pipe 26 to nozzle 20. Tetradecyl alcohol sulfate is obtained at outlet 31.

EXAMPLE 3

*Lauryl alcohol sulfate.*—The sulfation of lauryl alcohol is carried out as described in Example 2 above, with the exception that the concentration of the alcohol-$SO_2$ solution in pipe 26 is adjusted to 65% by weight of alcohol. Other suitable concentrations may be employed.

EXAMPLE 4

*Ethylene glycol disulfate.*—Ethylene glycol is dissolved in tank 3 and flowed to pipe 26 at such a rate as to produce an ethylene glycol-$SO_2$ solution having a concentration of approximately 25% by weight. At the same time a 30% solution of $SO_3$-$SO_2$ is supplied to pipe 19. The flow of the $SO_2$-$SO_3$ solution entering nozzle 20 is adjusted so as to provide two moles of $SO_3$ per mole of ethylene glycol in nozzle 20. The nozzle temperature was 50° C. The disulfate of ethylene glycol is obtained at outlet 31.

EXAMPLE 5

*Ethionic acid.*—This compound is prepared by the methods described in the Example 2 above, with the exception that ethyl alcohol is employed in place of the tetradecyl alcohol. The proportion of $SO_3$ supplied by means of pipe 19 is so proportioned as to furnish two moles of $SO_3$ per mole of ethyl alcohol. The yield of ethionic acid is substantially quantitative.

EXAMPLE 6

*Lauryl mono-glyceryl sulfate.*—Glyceryl monolaurate is sulfated, utilizing the process described in the above examples. Employing one mole of $SO_3$ per mole of the glyceryl mono-laurate the mono-sulfuric ester of this alcohol is obtained. The sodium salt of the ester is made by neutralizing the sulfate with sodium hydroxide solution, the solution of the sodium salt dried upon a steam heated drum and the product obtained in a pure form. This material may be employed as a detergent.

In a similar manner other mono- or diglycerides of fatty acids may be sulfated.

What I claim is:

1. In a process of solfation wherein a stream of liquid $SO_2$ containing dissolved $SO_3$ is mixed with a stream of liquid $SO_2$ containing a dissolved aliphatic hydroxy compound, whereby said hydroxy compound is sulfated and heat of sulfation is liberated, the step of flowing said mixed streams through a nozzle and completely evaporating said liquid $SO_2$ within said nozzle solely by means of said heat of sulfation, whereby said $SO_3$ becomes combined with said hydroxy compound at a temperature of at least 20° C.

2. In a process of sulfation in which a stream of liquid $SO_2$ containing dissolved $SO_3$ is mixed with a stream of liquid $SO_2$ containing a dissolved aliphatic hydroxy compound, whereby said hydroxy compound is sulfated and heat of sulfation is liberated, the step of flowing said mixed streams through a nozzle into a zone of lower pressure, complete evaporation of $SO_2$ occurring within said nozzle solely by means of said heat of sulfation, the pressure drop across said nozzle being at least 40 pounds per square inch.

3. In a process of sulfation in which a stream of liquid $SO_2$ containing dissolved $SO_3$ is mixed with a stream of liquid $SO_2$ containing a dissolved aliphatic hydroxy compound, whereby said hydroxy compound is sulfated and heat of sulfation is liberated, the step of flowing said mixed streams into and through a nozzle at a temperature of at least 20° C., wherein evaporation of liquid $SO_2$ occurs solely by means of said heat of sulfation, and recovering a sulfation product of said alphatic hydroxy compound.

4. In a process of sulfation in which a stream of liquid $SO_2$ containing dissolved $SO_3$ is mixed with a stream of liquid $SO_2$ containing a dissolved aliphatic hydroxy compound, whereby said hydroxy compound is sulfated and heat of sulfation is evolved, the steps of mixing said streams and flowing the so-formed mixture through a nozzle, wherein evaporation of liquid $SO_2$ occurs solely by means of said heat of sulfation and under substantially adiabatic conditions, said mixture thence flowing into a collection zone maintained at substantially atmospheric pressure.

5. In a process of sulfation in which a stream of liquid $SO_2$ containing dissolved $SO_3$ is mixed with a stream of liquid $SO_2$ containing a dissolved aliphatic hydroxy compound, whereby said hydroxy compound is sulfated, and heat of sulfation evolved, the steps of flowing said streams together into a nozzle whereby evaporation of liquid $SO_2$ occurs solely by means of said heat of sulfation and without substantial gain or loss of heat by said flowing stream, and spraying said stream into a zone of reduced pressure.

6. In a process of sulfation in which a stream of liquid $SO_2$ containing dissolved $SO_3$ is mixed with a stream of liquid $SO_2$ containing a dissolved aliphatic hydroxy compound, whereby said hydroxy compound is sulfated, and heat of sulfation evolved, the steps of flowing said streams together through a confined zone without substantial gain or loss of heat by said flowing stream, and wherein complete evaporation of liquid $SO_2$ occurs solely by means of said heat of sulfation, and then spraying said stream into a zone maintained at substantially atmospheric pressure.

JOHN K. FINCKE.

REFERENCES CITED

The following references are of record in the file of this patent:

UNITED STATES PATENTS

| Number | Name | Date |
|---|---|---|
| 1,511,875 | Edgar | Oct. 14, 1924 |
| 1,913,794 | Daimler et al. | June 13, 1933 |
| 2,235,098 | Brandt et al. | Mar. 18, 1941 |
| 2,268,443 | Crowder | Dec. 30, 1941 |
| 2,290,167 | Datin | July 21, 1942 |